(12) United States Patent
Tabeling

(10) Patent No.: US 6,688,207 B2
(45) Date of Patent: Feb. 10, 2004

(54) DUAL BLADE CLEAVER

(75) Inventor: Joseph W. Tabeling, Wilmington, DE (US)

(73) Assignee: Delaware Diamond Knives, Inc., Wilmington, DE (US)

( * ) Notice: Subject to any disclaimer, the term of this patent is extended or adjusted under 35 U.S.C. 154(b) by 0 days.

(21) Appl. No.: 09/758,506

(22) Filed: Jan. 12, 2001

(65) Prior Publication Data
US 2003/0196533 A1 Oct. 23, 2003

(51) Int. Cl.[7] .................................................. B26D 1/00
(52) U.S. Cl. ............................ 83/679; 83/950; 225/103
(58) Field of Search .................... 83/679, 950, 947; 30/90.1, 182; 225/97, 103–105; 81/9.4–9.44, 9.51

(56) References Cited

U.S. PATENT DOCUMENTS

| | | | |
|---|---|---|---|
| 1,910,627 A | * 5/1933 | Muntz | 30/182 |
| 3,160,493 A | 12/1964 | Kuppers | |
| 3,316,790 A | * 5/1967 | Frederiksen | 83/679 |
| 3,620,104 A | * 11/1971 | Horrocks | 30/90.1 |
| 3,824,887 A | * 7/1974 | Marchard | 83/679 |
| 3,962,939 A | 6/1976 | Stengle, Jr. | |
| 4,059,893 A | * 11/1977 | Solury | 30/90.1 |
| 4,452,105 A | * 6/1984 | Harootion | 30/90.1 |
| 4,530,452 A | * 7/1985 | Balyasny et al. | 225/106 |
| 4,731,928 A | * 3/1988 | Jackson | 81/9.41 |
| 5,010,797 A | * 4/1991 | Stepan | 83/883 |
| 5,361,489 A | * 11/1994 | Vatel | 81/9.51 |
| 5,412,856 A | * 5/1995 | Nazerian et al. | 81/9.51 |
| 5,481,638 A | * 1/1996 | Roll et al. | 30/90.1 |
| 5,511,305 A | * 4/1996 | Garner | 81/9.4 |
| 5,771,573 A | * 6/1998 | Talley | 81/9.51 |
| 6,115,527 A | * 9/2000 | Lochkovic et al. | 83/694 |
| 6,161,289 A | * 12/2000 | Alexander | 30/90.1 |
| 6,311,581 B1 | * 11/2001 | Hsieh | 81/9.51 |
| 6,487,939 B1 | * 12/2002 | Cowher et al. | 81/9.51 |
| 6,508,148 B2 | * 1/2003 | Hombu | 81/9.51 |
| 6,577,804 B2 | * 6/2003 | Murakami et al. | 83/947 |

* cited by examiner

*Primary Examiner*—Allan N. Shoap
*Assistant Examiner*—Jason Prone
(74) *Attorney, Agent, or Firm*—E. Alan Uebler, P.A.

(57) ABSTRACT

Dual bladed apparatus for cleaving optical fibers is provided. The apparatus includes a housing having an opening therein for receiving an optical fiber, with or without insulation thereon and whether or not contained within a ferrule, the apparatus having dual, opposing, cooperatively operable cutting means reciprocally moveable transversely to the fiber, which cutters are positioned in adjacent proximity to the exit of the opening. On insertion of a fiber through the opening and upon actuation of the cutters, the fiber is cleaved. Fibers having diameters up to 3 millimeters can be cleaved, and angled cleaves are achievable.

32 Claims, 4 Drawing Sheets

DUAL BLADE CLEAVER

BACKGROUND OF THE INVENTION

The invention relates to methods and apparatus for cleaving optical fibers. More particularly, the invention relates to cleaving of optical fibers using dual, opposing cutter means*.

*The terms "cutting" and "cutter" as used herein are intended to refer to the action of the cutter means resulting in the cleaving of the fiber.

Optical fibers are gaining increasing use in diverse applications, particularly in telecommunications and waveguides, wherein light energy is transmitted through long distances within the optical fibers with little or no concomitant energy losses. Devices which employ optical fibers often must be coupled one to another, and such coupling requires the severance and the reconnecting thereof of the transmitting fibers. Optical fibers are, generally, made of glass, which material presents a unique set of problems associated with the severing and reconnecting of such fibers. Loss of light energy at a coupling is detrimental to most transmissions and is to be avoided.

A junction between light fibers should be as near-perfect as possible; that is, the glass-to-glass interface should abut precisely one fiber to another, to minimize energy losses and signal imperfections at these junctures. To accomplish precise joining, a precision cleaving tool must be employed.

Miles of optical fibers are installed "in the field", that is, far removed from precision instrumentation. Various cleaving tools have been devised for field use, which provide various degrees of acceptability for the cleaved joint and for ease of operation, which also is of paramount importance in field use. Repeatability and consistency in cleavage are also important considerations for any tool.

The usual method of severing a glass fiber involves placing it under tension, as by bending, and nicking the fiber at a point of highest tension in the bend arc. An optical fiber which is bent and then scribed or nicked will break (sever) at the scribe as a result of the variation in tensile stress across the cross-section of the fiber created by the bend. The break will be in the brittle mode and leave only slight imperfections across the fiber cross-section, which can then be removed by polishing, to produce an acceptable, virtually imperfection-free surface and subsequent joint.

An example of a known scribe-and-break tool for field use is found in U.S. Pat. No. 5,301,868. That patent discloses a scribe-and-break tool for fracturing the free end of an optical fiber said to be suitable for hand-holdable configurations and field use. The tool has an elongated body and a plunger that actuates a blade for scribing the free end of an optical fiber retained in tension within a depressible head that extends outwardly from the body. The free end of the optical fiber contacts the blade, thereby scribing the free end of the fiber causing the free end to break off.

See also the patents referred to and distinguished in U.S. Pat. No. 5,301,868, especially U.S. Pat. No. 5,063,672, which discloses an alternative hand held tool for scoring and severing an optical fiber and is also said to be suitable for field use.

My prior U.S. patent application, Ser. No. 09/414,581, discloses and claims a device for cleaving optical fibers which, in a hand-held unit suitable for field use, provides for the sequential bending and cutting of a fiber resulting in a precise cut extending across the fiber perpendicularly to the fiber axis.

In contrast to prior devices which operate, generally, in the "bend-and-nick" mode, the present invention provides apparatus in which the fiber is not purposely bent to induce tension. Further, with the present device, while precise and perpendicular cuts may be achieved, in addition angled cleaves become possible. These cleavages are achieved through use of dual, opposing, cooperatively operable cutting means reciprocally moving in a "pinch" mode to sever and cleave a fiber, all in contrast to the prior art "bend-and-nick" devices.

Reciprocating blades are known in glassmaking processes wherein a stream of molten glass is cut into discrete charges known as "gobs". See, for example, U.S. Pat. No. 3,962,939. Such cutting of glass streams generally results in troublesome imperfections in the final product known as "cutter marks", and such imperfections must be subsequently removed or cured before use. See, for example, U.S. Pat. No. 3,160,493.

In contrast to these known prior devices, the present invention provides apparatus and methods for cleaving optical fibers, specifically solid glass fibers, using dual, opposing, reciprocally operable cutting means which provide cleaves heretofore unachievable and greatly improved over those attainable with the previously known devices.

SUMMARY OF THE INVENTION

Apparatus is provided for cleaving optical fibers. The apparatus includes a housing assembly having an opening therein for receiving an optical fiber to be cleaved, and dual, opposing, cooperatively operable cutting means reciprocally moveable in opposite directions substantially transversely to the longitudinal axis of an optical fiber inserted into and through the opening and exiting between the dual cutting means. The cutting means are mounted in adjacent proximity to the exit of the opening. Upon insertion of an optical fiber through the opening and into the housing, and upon actuation of the cutting means, the fiber is cleaved.

The cutting means preferably are diamond knives.

The fiber to be cleaved may be sheathed within insulation or contained within a connector such that the fiber extends outwardly from either exposing a free end thereof. The opening has a diameter large enough to receive the fiber but is smaller than the insulation or connector diameter, which effectively prevents the insulation or connector from insertion into the opening in the housing. Upon actuation of the cutting means, a predetermined, exposed length of fiber extending beyond the insulation or connector, equal to the predetermined distance between the entrance to the opening and the cutting means, is cleaved.

The fiber may be a glass fiber, and in a typical installation the fiber is a glass fiber encased in polymeric insulation or a ceramic ferrule and the cutting means is positioned within the housing so as to effect cutting a predetermined length of fiber extending from and exposed from the ferrule or insulation.

The glass fiber to be cleaved may have a diameter of approximately 125 micrometers or less, to and including approximately 250 micrometers and up to approximately 3 millimeters. For fibers extending from connectors, the predetermined cleave length, that is, the length of exposed fiber extending backwardly from cleave to ferrule, may be a length within a range of up to 500 micrometers, is typically a length within the range of 25 to 250 micrometers, and for many applications is about 100 micrometers. In the case of insulated fibers not contained in connectors, the predetermined cleave length, that is, the length of exposed fiber extending backwardly from cleave to insulation, may be a length within the range of up to 50 millimeters, is typically within the range of 0 to 20 millimeters and for many applications is about 10 millimeters.

In this apparatus, each of the dual cutting means may be spring-mounted; for example, each may be mounted on a leaf spring wherein both leaf springs are identical having the same spring constant. This preferred embodiment of the apparatus is such that each cutting means is manually operable, in the simplest form by the thumb and forefinger action of an operator acting, respectively, on each of the dual, reciprocally moveable leaf springs.

In an alternate embodiment, also preferred, the apparatus may have dual, reciprocally moveable cutting means which are cam-actuated. Such mechanically actuated apparatus may include a housing assembly which is generally cylindrical in shape and, optionally, has removably connected thereto a receptacle for receiving and collecting cut ends of a plurality of cleaved fibers.

The apparatus may include dual, opposing, reciprocally moveable diamond knives oriented such that the blade edge of each is perpendicular to the longitudinal axis of the fiber. Alternatively, the blade edge of each knife may be oriented at an angle offset from the perpendicular to the longitudinal fiber axis, to effect an angled cleave. The cleave angle is generally less than 45° and, for typical applications, is less than 10°.

The apparatus may include a cleave-length-determining, removably affixed fitting mounted adjacent to the entrance of the housing opening and having a longitudinal orifice extending therethrough. The orifice corresponds to and acts cooperatively in line with the opening in the housing, and has a desired, pre-set, effective bore length. Upon actuation of the cutting means, with the fiber inserted to the hilt formed by the insulation (or ferrule, as the case may be), the optical fiber is cleaved, leaving a predetermined length of bare fiber corresponding to the effective bore length exposed from the cleave backwardly to the insulation (ferrule). This apparatus may have a plurality of interchangeable such fittings, each having a desired pre-set bore length.

The apparatus may have a housing assembly fabricated of aluminum, plastic, or other suitable material, and a preferred plastic is glass filled polycarbonate.

DETAILED DESCRIPTION OF THE INVENTION AND PREFERRED EMBODIMENTS WITH REFERENCE TO THE DRAWINGS

Dual bladed apparatus for cleaving optical fibers is provided. The apparatus includes a housing having an opening therein for receiving an optical fiber, with or without insulation thereon and whether or not contained within a ferrule, the apparatus having dual, opposing, cooperatively operable cutters reciprocally moveable transversely to the fiber. The cutters are positioned in adjacent proximity to the exit of the opening. On insertion of a fiber through the opening and upon actuation of the cutters, the fiber is cleaved. Fibers having diameters up to 3 millimeters can be cleaved, and angled cleaves are achievable.

Figure 1:
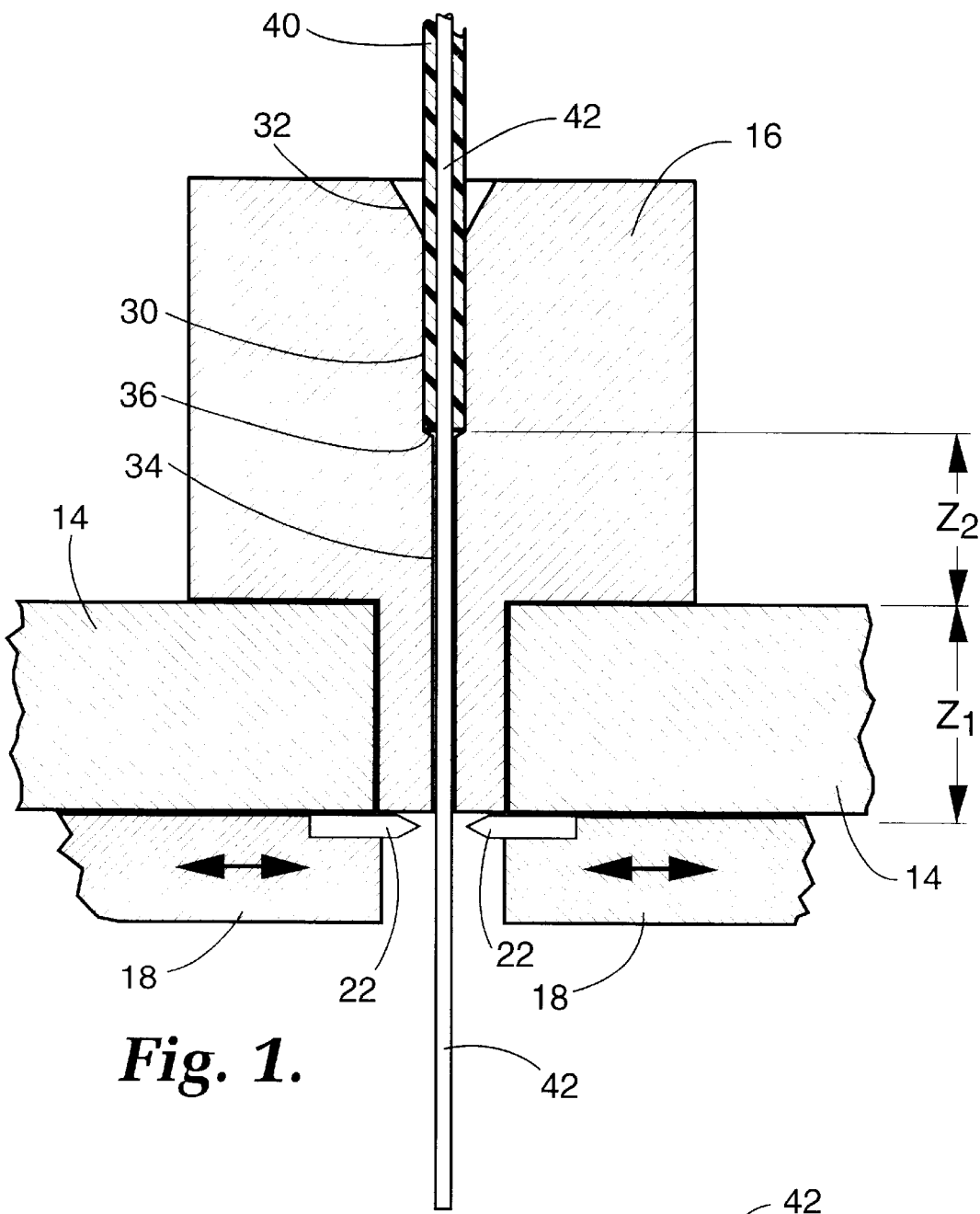
FIG. 1 is an elevational, cross-sectional view, enlarged, of the basic components of one embodiment of the dual bladed optical fiber cleaver of the invention, viewed just prior to cleaving a fiber.

A detailed description of the invention and preferred embodiments is best provided by reference to the accompanying drawings, wherein FIG. 1 is an exploded, cross-sectional view of the basic components according to one preferred embodiment of the invention, illustrating their relative interactions. A more detailed description of the complete cleaving apparatus, including auxiliary components, is provided below in connection with describing the remaining figures.

In FIG. 1, an optical fiber 42 to be cleaved, with or without a connecting ferrule (not shown), having insulation 40, or, alternatively, the bare fiber 42, is inserted into opening 30 having optional tapered entry 32 as shown. Enough of the insulation 40 and/or ferrule, if any, is stripped/removed to expose the required length of bare fiber 42, sufficiently in excess of the final cut length desired, such that upon insertion into opening 30 the fiber extends longitudinally downwardly through the opening 30, and through the bore 34, having predetermined length $Z_2$, shown expressly in further detail in FIG. 4, and outwardly and downwardly from the exit of bore 34 in the guidance insert 16. The separate z-dimension lengths, $z_1$, and $z_2$ for the guidance insert 16, are fashioned by machining, casting or otherwise so as to provide predetermined cleave lengths of fibers to be cut. Use of a plurality of guidance inserts 16, each with its separate, predetermined combinations of dimensions, $z_1$ and $z_2$, enables the provision of several possible cleave lengths to be used interchangeably, to provided cleaved fibers adaptable to fit various connectors and splices.

Immediately adjacent below the exit of opening 34 are positioned the cutting means 22, mounted in and affixed to slidable push rods or rams 18, their movement indicated by the double pointed arrows shown. The cutting means 22 are preferably diamond knife blades.

Figure 2:
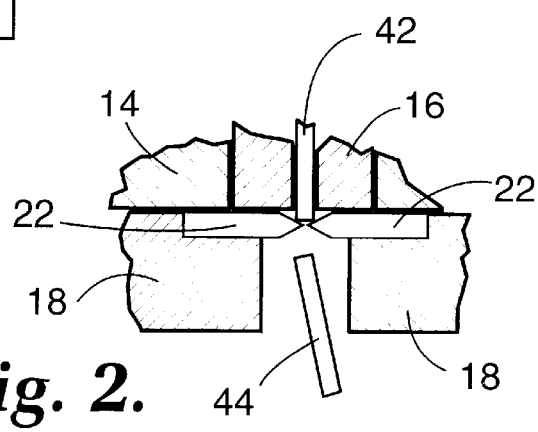
FIG. 2 depicts the cleaving apparatus shown in FIG. 1 just after the fiber has been cleaved.

Upon actuation of the push rods 18, the cutting blades come together in a "pinching" action upon the fiber 42, and cleaving is effected, as depicted further in FIG. 2. In FIG. 2, the cleaved end 44 of the fiber 42 is shown falling away, and may be discarded. Prior art cleave tools, generally, utilize the "bend to create tension and nick" procedure described above, which often leaves imperfections at the cleave, called "tails" or "hooks". The instant invention does not involve that principle, and, therefore, substantially eliminates such "tails" and "hooks".

In general, the cutting means 22 act cooperatively and reciprocally of one another, in opposite directions and generally transversely to the longitudinal axis of the fiber 42. While perpendicular transverse cleaves are the usual objective for most applications, angled cleaves are possible and are described more fully hereinbelow.

Figure 3:
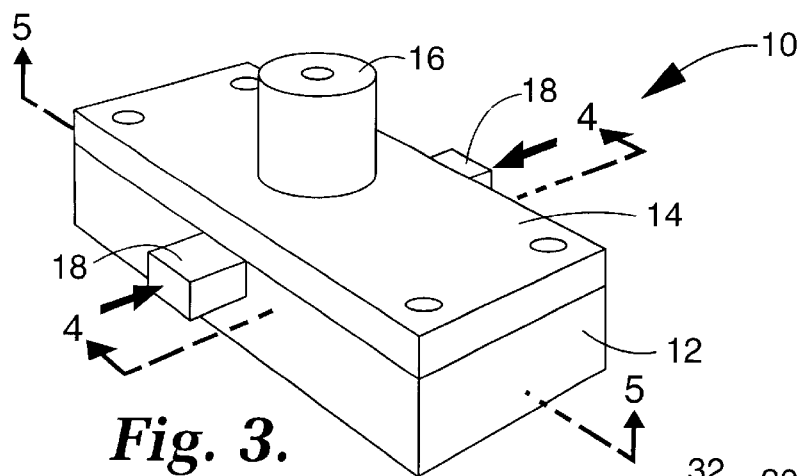
FIG. 3 is a perspective view of one preferred embodiment of the invention, including a housing containing cooperatively operable leaf springs upon each of which is mounted cutting means.

FIG. 3 depicts, in perspective, an overall view of one embodiment of an entire fiber cleaving apparatus 10 according to the invention. FIG. 3 shows housing base 12 affixed using conventional fasteners such as screws to the housing upper portion 14 having a central aperture which receives therein the guidance insert 16 as shown and actuating push rods 18, the details of which are found in FIG. 4. The reciprocating operation of the push rods 18 is indicated by the arrows shown.

Figure 4:
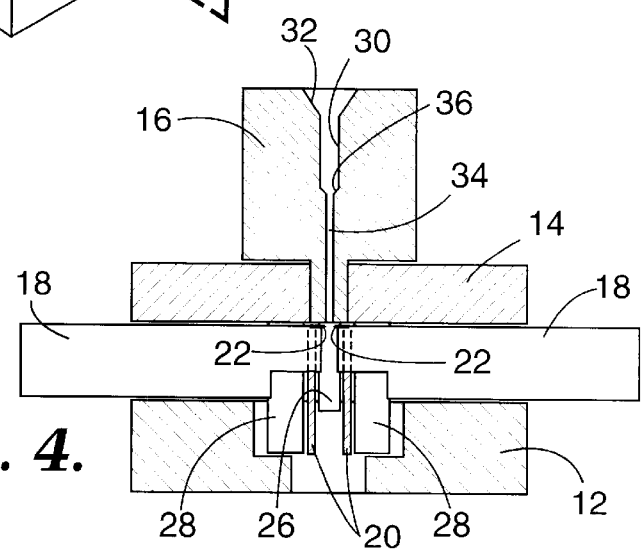
FIG. 4 is a cross-section of the apparatus of FIG. 3 taken along 4—4 of FIG. 3.

FIG. 4 is a cross-section of the apparatus of FIG. 3 taken substantially along line 4—4 thereof. The base 12 of the housing has a central cavity which is capped by the upper portion 14 as shown and in which is housed the pair of cutting means 22, each of which is affixed to and mounted, as shown, on its respective push rod 18. Each inner end of the push rods 18 is mounted and affixed to one of a pair of leaf springs 20, each of which is identical to the other and which, together, react to any action of force pushing on the rods 18. Anchor pin 26 and clamps 28, described below, appear in this cross-sectional view and are included for completeness.

Guidance insert 16 is removably inserted into the central aperture of the housing upper portion 14 as shown. The guidance insert 16 has opening 30 therein, preferably with flared entry 32 proximate the entrance to opening 30, for receiving optical fibers therein which may or may not have encasing polymeric insulation 40 thereon. Downwardly from opening 30 is bore 34, also having optional flared entry 36, into which and through the length of stripped fiber 42 extends, exiting from the exit end of bore 34 and extending between the cutters 22 mounted on their respective push rods 18 which are kept in the "open" or parted configuration by the leaf springs 20.

The cutter means 22, each of which is preferably a diamond knife blade, are mounted as shown in adjacent proximity to the exit of bore 34. Upon insertion of a fiber 42 into and through the openings in a guidance insert 16, such that the fiber 42 is positioned between the cutters 22, and application of force to both external ends of push rods 18, such as by application of thumb and forefinger of an operator, the fiber is cleaved, as described above in connection with FIG. 1.

A plurality of guidance inserts 16, having different predetermined bore lengths of the openings therethrough, and all being interchangeable and readily removable and replaceable into housing upper portion 14, can provide several and varied available cleave lengths, i.e. length of exposed fiber 42 extending from insulation 40, for use with different connectors and splices, specifically, various combinations of the length $Z_1+Z_2$ depicted in FIG. 1.

Fibers having diameters of 125, 250 micrometers and up to and exceeding 3 millimeters may be cleaved using the apparatus of this invention. Pre-determined cleave lengths in the range of 25 to 250 micrometers are achievable. The length of cleave is not critical to the invention, and it may cover a wide range of lengths of exposed bare fiber.

Figure 5:
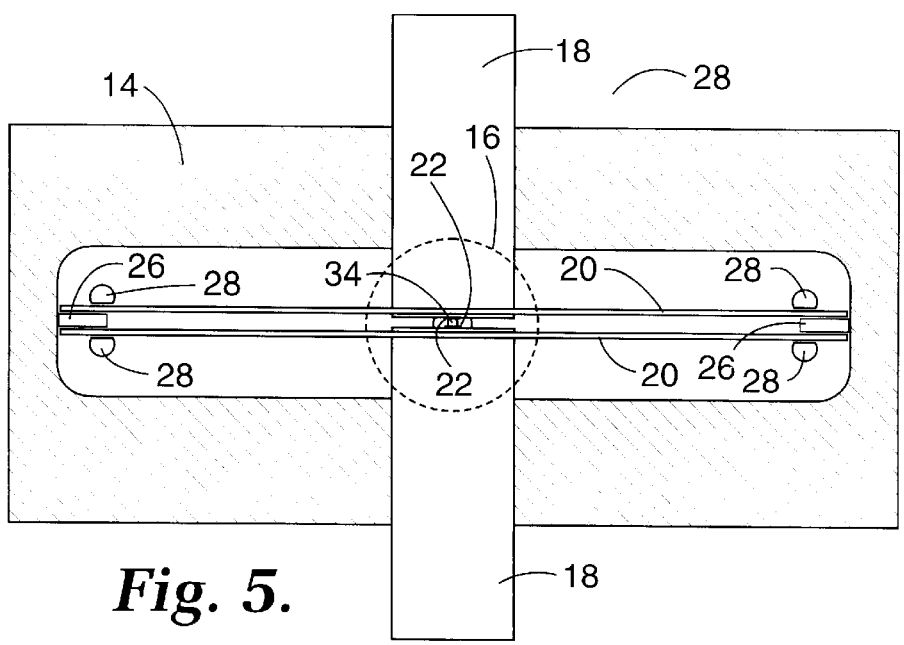
FIG. 5 is a cross-section of the apparatus depicted in FIGS. 3 and 4 taken along line 5—5 of FIG. 4.

FIG. 5 is a cross-sectional view of the unit 10 of FIG. 3, but taken substantially along line 5—5 of FIG. 3. Lengthwise of housing portion 14 are oriented the leaf springs 20, which may be of spring steel, and which are affixed at their opposite ends to the housing by means of anchors 26 and clamping means 28. Push rods 18 are shown affixed, one to each spring 20 and having affixed thereto, adjacent the exit opening of bore 34, in guidance insert 16 (shown dotted), the cutting blades 22.

Figure 6:
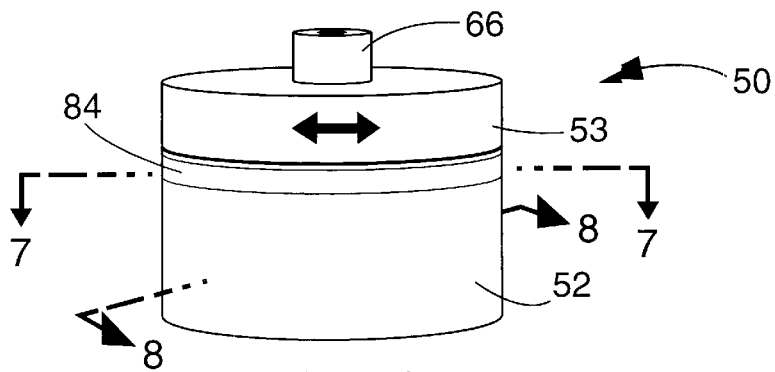
FIG. 6 is a perspective view of an alternate, also preferred, embodiment of the invention, including a housing containing cooperatively operable cutting means which are cam-actuated.

An alternate embodiment 50 of the dual bladed cleaver of the invention is shown in FIG. 6. The device 50 includes a housing assembly having a housing base 52, generally cylindrical in shape, detachably connected to the upper, cylindrical housing portion 53, having a central aperture therethrough, described more fully below. The upper portion 53 is detachably affixed to the base 52 by means of snap-ring connector 84. A guidance insert 66, similar in function to the insert 16 shown in FIGS. 1 and 3, is removably fitted into the central aperture of upper housing member 53, as shown. The upper housing member 53 is rotatable through 360°, in either direction, with respect to the base housing member 52, as indicated by the double headed arrow, for reasons which will become apparent.

Figure 7:
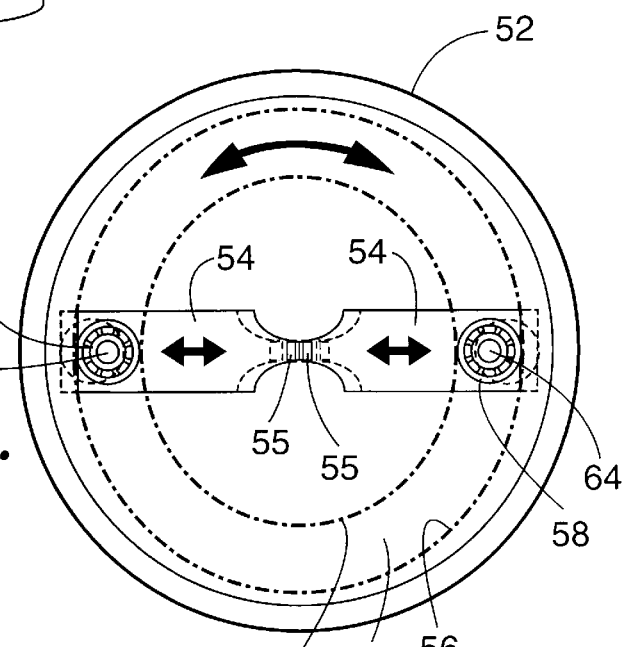
FIG. 7 is a cross-sectional view of the apparatus of FIG. 6 taken along line 7—7 of FIG. 6.

FIG. 7 shows a top plan view of the housing base 52, taken with the upper housing section 53 and snap ring connector 84 removed. Although the upper section 53 is removed in FIG. 7, the pathway 62 formed by sidewalls 56 and 60, described below, is shown in phantom in FIG. 7 for clarity of illustration. Slidable with respect to the upper flat surface of base 52 are two blade actuation arms 54, preferably shaped as shown, and having affixed to the inside end of each arm a cutting means 55, which cutting means are preferably diamond knife blades. The slidable arms 54 are pinned at each of their outer ends to roller bearings, 58, which roller bearings 58 traverse an elliptical pathway 62 about the centerline axis of unit 50 upon rotation of the upper housing member 53 with respect to lower housing member 52 such as, for example, by a technician rotating one member with respect to the other by hand.

The pathway 62, formed in the housing by suitable means such as machining or casting, provides an elliptical path for bearings 58 to traverse upon rotation as stated, the result being a sequential pinching and retraction movement of blades 55 with respect to each other as the housing members are rotated with respect to one another, all as indicated by the double headed arrows shown in FIG. 7.

Figure 8:
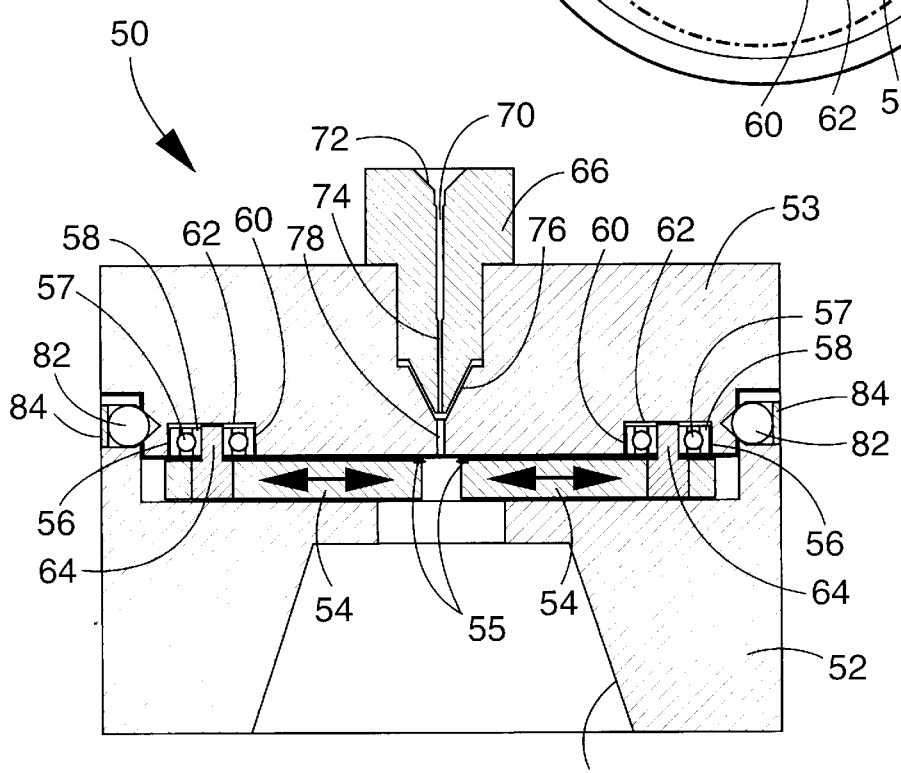
FIG. 8 is an elevational cross-section of the apparatus of FIG. 6 taken along line 8—8 of FIG. 6.

A clearer understanding of the configuration of and the interrelation and reactions of the upper and lower members may be obtained with reference to FIG. 8. FIG. 8 is a cross-sectional view of the unit 50 taken substantially along line 8—8 of FIG. 6. The bearings 58 travel within the constant-width elliptical groove formed in the upper housing 53, as the upper section 53 is rotated with respect to lower housing section 52, the elliptical walls 56 and 60 (see FIG. 7 also) of this channel acting as a cam mechanism which, as rotation is effected, causes the slidable blade arms 54 with blades 55 to come together at the position wherein the arms 54 are directed along the short axis of the ellipse and to retract at the position wherein the arms are directed along the long axis of the ellipse. An optical fiber which is inserted into the opening 70 in the guidance insert 66 and which extends therethrough to and past blades 55 is cleaved by blades 55 as they pass through the pinching phase of the rotational cycle.

The bearing housing 58 having ball bearings 57, all riding on support pin 64 affixed to slide arm 54, and the snap ring 84 which is used to effect detachable attachment of base 52 and upper housing 53, in conjunction with dimple and ball bearings 82, are shown for completeness.

The bearing housing 58 having ball bearings 56, and the snap ring 84 which is used to effect detachable attachment of base 52 and upper housing 53, in conjunction with dimple and ball bearings 82, are shown for completeness.

Blades 55 are affixed to slide arms 54 in close, adjacent proximity to the exit of bore 78 in the upper housing member 53, in similar fashion to the blades 22 described above. The blades may be affixed, for example, by means of an epoxy adhesive.

The guidance insert 66 shown in FIG. 8, in similar fashion to insert 16 above, may be one of a plurality of various dimensioned inserts, each having a predetermined height and bore length, i.e., $Z_1+Z_2$, any of which may be used interchangeably as the need presents. For the insert 66 shown extending into tapered entry 76 to the entrance of opening 78, a flared entry 72 guides an optical fiber, which may or may not be insulated and may or may not have a connecting ferrule, into opening 70 and thence to bore 74 which is of a diameter slightly greater than the diameter of the fiber to be cleaved. The fiber extends outwardly from the exits of openings 74 and 78 into the cavity 80 within the housing base 52 and is positioned between the two blades 55. A twist of housing top 53 with respect to lower housing member 52 results in cleavage of the fiber.

Figure 9A:
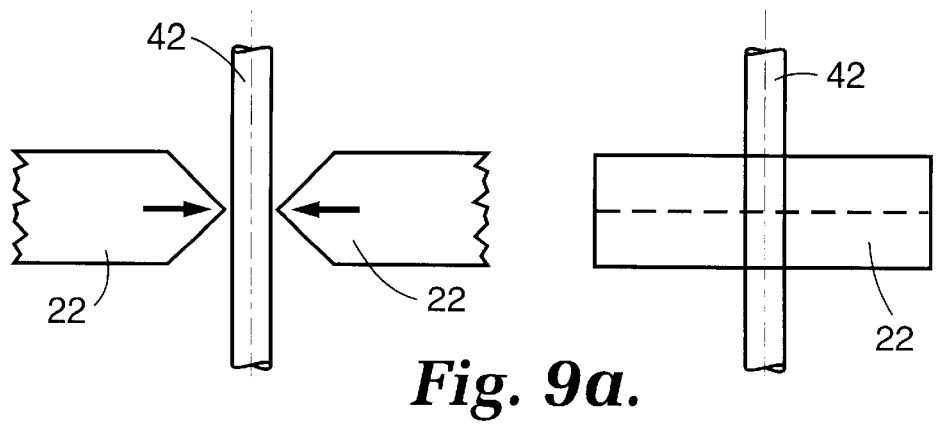
FIGS. 9a through 9c depict alternate embodiments of blade and blade/anvil configurations useable according to the invention to produce desired cleaves, with FIG. 9c showing the tilted dual blade configuration, tilted with respect to the fiber longitudinal axis, employed to produce an angled cleave.
Figure 9B:
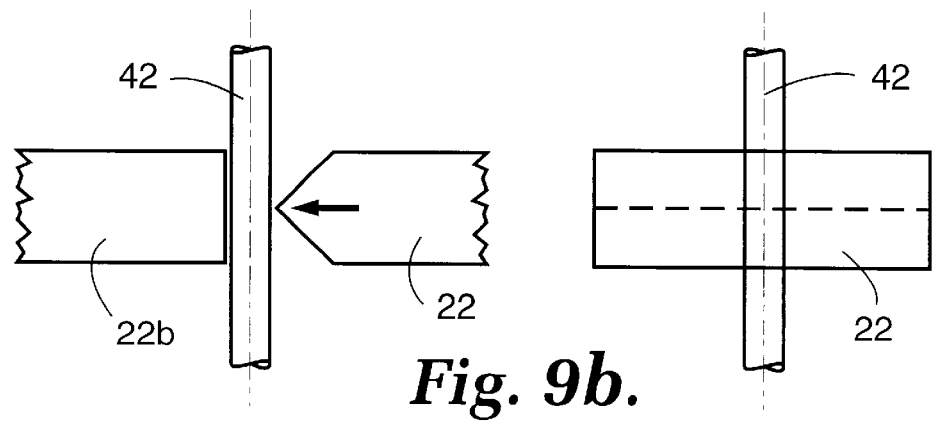
Figure 9C:
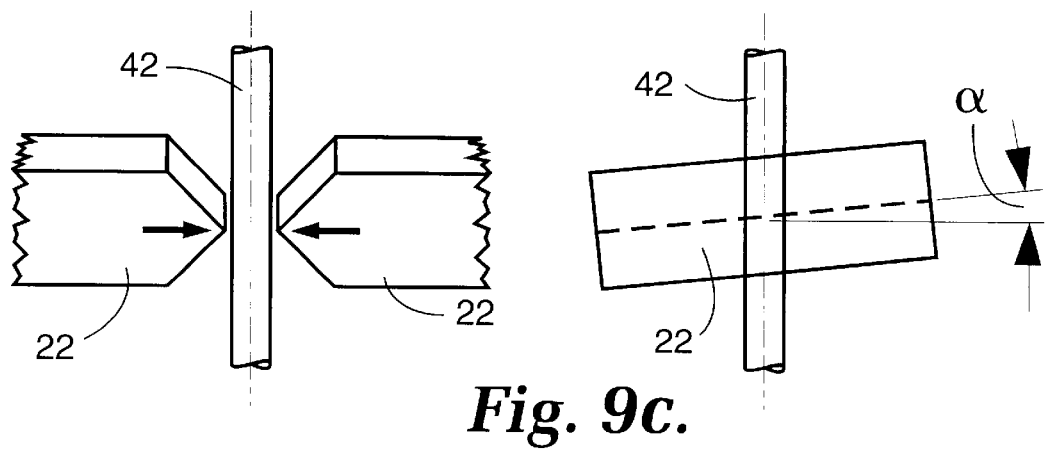

The various FIGS. 9a through 9c depict possible alternative configurations of dual cutting blades, all effective in cleaving optical fibers in the apparatus of the invention. FIG. 9a shows opposing knife blades 22, in elevation on the left hand view, with fiber 42 positioned between them and rotated 90° therefrom in the right side view.

FIG. 9b shows a knife blade 22 acting in opposition to anvil 22b, and having the fiber 42 positioned between them. The quarter turn rotation depicted on the right indicates, as also shown in FIG. 9a, a substantially perpendicular cleave, that is, the cleaved surface of the fiber is at approximately a right angle with the longitudinal axis of the fiber.

Positioning the cutting blades 22 at a tilt angle with respect to the plane of intersection through the fiber, essentially as shown in FIG. 9c, provides an angled cleave, as shown in the right hand view of FIG. 9c, wherein the cleave tilt angle is represented as a. Tilt angles a in the range of up to about 45° can be used to produce angled cleaves where such configuration is useful or desirable.

As described above, the cutting means according to the invention are preferably diamond knives. The springs are preferably spring steel. And the housing assembly and receptacles may be fabricated of aluminum or other metal, or a suitable plastic, for example a polycarbonate or a nylon, all known to those skilled in the art. A preferred plastic is glass-filled polycarbonate. These components may be fabricated by machining or by casting, as is also known, depending in some respects on allowable tolerances. Fasteners, bearings, etc., are conventional.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Apparatus for cleaving optical fibers comprising:
    a housing assembly having an opening therein for receiving an optical fiber to be cleaved, and including
        dual, opposing, cooperatively operable cutting means reciprocally moveable in opposite directions substantially transversely to the longitudinal axis of an optical fiber inserted into and through said opening and between said dual cutting means, said cutting means mounted in adjacent proximity externally of the exit of said opening,
        said cutting means having no more than one pair of linearly disposed, oppositely coacting cutting blades,
        and further including a plurality of length-determining, interchangeable, removably affixable fittings mountable adjacent to the entrance of said opening, each having a longitudinal orifice extending therethrough, which orifice corresponds to and acts cooperatively in line with said opening, each said orifice having a desired, pre-set, effective bore length.

2. The apparatus of claim 1 wherein said cutting means comprises diamond knives.

3. The apparatus of claim 2 wherein the dual, opposing, reciprocally moveable diamond knives are oriented such that a common imaginary plane through the blade edge of each is perpendicular to the longitudinal axis of said fiber.

4. The apparatus of claim 2 wherein a common imaginary plane through the blade edge of each is oriented at an angle offset from the plane perpendicular to the longitudinal fiber axis.

5. The apparatus of claim 4 wherein said angle is less than 45°.

6. The apparatus of claim 5 wherein said angle is less than 30°.

7. The apparatus of claim 5 wherein said angle is less than 15°.

8. The apparatus of claim 5 wherein said angle is less than 10°.

9. The apparatus of claim 1 wherein said fiber is sheathed within insulation such that the fiber extends outwardly from said insulation exposing a free end thereof, and wherein said opening has a diameter large enough to receive said fiber but smaller than the diameter of said insulation, which effectively prevents the insulation from insertion into said opening in said housing, whereby, upon actuation of said cutting means, a predetermined, exposed length of fiber extending beyond said insulation, equal to the predetermined distance between the entrance of said opening and said cutting means, is cleaved.

10. The apparatus of claim 9 wherein said fiber is a glass fiber and said cutting means is positioned within said housing so as to effect cutting a predetermined length of fiber exposed from said insulation.

11. The apparatus of claim 10 wherein said predetermined length is a length within a range of up to 50 millimeters.

12. The apparatus of claim 11 wherein said predetermined length is a length within the range of up to 20 millimeters.

13. The apparatus of claim 12 wherein said predetermined length is about 10 millimeters.

14. The apparatus of claim 1 wherein said fiber is a glass fiber.

15. The apparatus of claim 1 wherein said fiber is a glass fiber having a diameter of approximately 125 micrometers.

16. The apparatus of claim 1 wherein said fiber is a glass fiber having a diameter of approximately 250 micrometers.

17. The apparatus of claim 1 wherein said fiber is a glass fiber having a diameter up to approximately 3 millimeters.

18. The apparatus of claim 1 wherein each of said dual cutting means is spring-mounted.

19. The apparatus of claim 18 wherein each spring-mounting means is a leaf spring.

20. The apparatus of claim 18 or 19 wherein both springs are identical having the same spring constant.

21. The apparatus of claim 18 wherein each said cutting means is manually operable, in the simplest form by the thumb and forefinger action of an operator acting, respectively, on each of said dual, reciprocally moveable leaf springs.

22. The apparatus of claim 1 wherein said dual, reciprocally moveable cutting means are cam-actuated.

23. The apparatus of claim 22 wherein said housing assembly is generally cylindrical in shape and, optionally, has removably connected thereto a receptacle for receiving and collecting cut ends of a plurality of cleaved fibers.

24. The apparatus of claim 1 including one of said plurality of length-determining, fittings mounted adjacent to the entrance of said opening and having a longitudinal orifice extending therethrough, which orifice corresponds to and acts cooperatively in line with said opening, said orifice having a desired, pre-set, effective bore length, whereby, upon actuation of said cutting means, said optical fiber is cleaved leaving a predetermined length of bare fiber corresponding to said effective bore length exposed from the cleave backwardly.

25. The apparatus of claim 1 wherein said optical fiber extends outwardly from a connector exposing a free end thereof, and wherein said opening has a diameter large enough to receive said fiber but smaller than the diameter of said connector, whereby, upon actuation of said cutting means, a predetermined, exposed length of fiber extending beyond said connector, equal to the predetermined distance between the entrance of said opening and said cutting means, is cleaved.

26. The apparatus of claim 25 wherein said fiber is a glass fiber and said cutting means is positioned within said housing so as to effect cutting a predetermined length of fiber exposed from said connector.

27. The apparatus of claim 26 wherein said predetermined length is a length within a range of up to 500 micrometers.

28. The apparatus of claim 27 wherein said predetermined length is a length within the range of 25 to 250 micrometers.

29. The apparatus of claim 28 wherein said predetermined length is about 100 micrometers.

30. The apparatus of claim 1 wherein said housing assembly is fabricated of aluminum.

31. The apparatus of claim 1 wherein said housing assembly is fabricated of plastic.

32. The apparatus of claim 31 wherein said plastic is glass filled polycarbonate.

* * * * *